(12) United States Patent
Lee et al.

(10) Patent No.: US 8,807,593 B2
(45) Date of Patent: *Aug. 19, 2014

(54) ROOF AIRBAG DEVICE FOR VEHICLE

(71) Applicant: Hyundai Motor Company, Seoul (KR)

(72) Inventors: Chang Hyun Lee, Yongin-si (KR); Jun Yeol Choi, Seoul (KR); Un Koo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,479

(22) Filed: Jul. 1, 2013

(65) Prior Publication Data

US 2013/0292927 A1    Nov. 7, 2013

Related U.S. Application Data

(63) Continuation-in-part of application No. 13/323,586, filed on Dec. 12, 2011.

(30) Foreign Application Priority Data

Oct. 5, 2011    (KR) .......................... 10-2011-0100993

(51) Int. Cl.
 *B60R 21/214*    (2011.01)
(52) U.S. Cl.
 USPC ....................................................... 280/730.1
(58) Field of Classification Search
 USPC ............................................ 280/730.1, 728.2
 See application file for complete search history.

(56) References Cited

U.S. PATENT DOCUMENTS

| | | | | |
|---|---|---|---|---|
| 2,834,606 | A * | 5/1958 | Bertrand | 280/730.1 |
| 3,606,377 | A | 9/1971 | Martin | |
| 5,470,103 | A | 11/1995 | Vaillancourt et al. | |
| 6,419,262 | B1 | 7/2002 | Fendt et al. | |
| 6,817,626 | B2 * | 11/2004 | Boll et al. | 280/730.1 |
| 6,932,380 | B2 * | 8/2005 | Choi | 280/730.1 |
| 7,625,008 | B2 | 12/2009 | Pang et al. | |
| 7,673,901 | B2 | 3/2010 | Hanawa et al. | |
| 7,918,480 | B2 | 4/2011 | Kwon et al. | |
| 7,926,840 | B1 | 4/2011 | Choi | |
| 8,215,665 | B2 | 7/2012 | Ohara et al. | |
| 8,328,228 | B2 * | 12/2012 | Lee et al. | 280/730.1 |
| 2005/0073135 | A1 | 4/2005 | Choi | |
| 2005/0104339 | A1 | 5/2005 | Hasebe et al. | |
| 2005/0184489 | A1 | 8/2005 | Kobayashi | |
| 2007/0262572 | A1 | 11/2007 | Fischer et al. | |
| 2010/0090447 | A1 | 4/2010 | Deng et al. | |
| 2011/0018240 | A1 | 1/2011 | Marable et al. | |
| 2012/0049492 | A1 | 3/2012 | Choi et al. | |
| 2013/0087995 | A1 * | 4/2013 | Lee et al. | 280/728.2 |

FOREIGN PATENT DOCUMENTS

KR    10-2010-0120400 A    11/2010

* cited by examiner

*Primary Examiner* — Faye M. Fleming
(74) *Attorney, Agent, or Firm* — Morgan, Lewis & Bockius LLP

(57) ABSTRACT

A roof airbag device includes an outer cushion and an inner cushion. The outer cushion includes a left wing part and a right wing part, which are oppositely disposed about the passenger's head, an upper cushion part connecting the left and right wing parts, and an outlet hole through which an inflation gas from an inflator is transferred. The inner cushion is disposed between the left and right wing parts, and has an inlet hole through which the inflation gas is supplied, and a discharge hole through which the inflation gas is discharged.

5 Claims, 5 Drawing Sheets ly in the art.

ROOF AIRBAG DEVICE FOR VEHICLE

CROSS-REFERENCE TO RELATED APPLICATION

This application is a Continuation-in-Part of U.S. patent application Ser. No. 13/323,586 filed Dec. 12, 2011, which application claims priority of Korean Patent Application Number 10-2011-0100993 filed Oct. 5, 2011, the entire contents of which applications are incorporated herein for all purposes by this reference.

BACKGROUND OF INVENTION

1. Field of Invention

The present invention relates, in general, to a roof airbag device for a vehicle and, more particularly, to a roof airbag device which is installed on an inner surface of the roof of a vehicle on the passenger side, and protects a passenger when a vehicle collision occurs.

2. Description of Related Art

As shown in FIG. 1, a conventional passenger-side airbag device is a device that is built in to a dash board 500 and is designed to inflate an airbag cushion 502 during a vehicle collision, thereby deploying the airbag cushion 502 out of the dash board 500 to protect a passenger. Here, when inflated, the airbag cushion 500 deploys while being guided between the windshield 504 and an upper portion of the dash board 500.

Such a passenger-side airbag device has drawbacks in that it requires high capacity equipment because a distance between the device and a passenger is relatively large, that the weight is heavy and the cost is relatively high, and that it is difficult to establish the standardization thereof, because vehicles have different dash board and windshield designs, so the shape and structure of the airbag cushion should be correspondingly changed.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, the present invention has been made keeping in mind the above problems occurring in the related art, and the present invention is intended to propose a roof airbag device for a vehicle, which shortens a distance between the device and a passenger to thereby ensure quick restraint of the passenger, even with low capacity equipment, provides a differentiated support to support the passenger's head and upper body, thereby effectively preventing an injury to the passenger's head and upper body, and is deployed irrespective of the designs of a dash board and a windshield to thereby facilitate its standardization.

Various aspects of the present invention provide for a roof airbag device for a vehicle, including: an outer cushion having, when inflated, a shape of an inverted-U type, a circumferential wall of which extends longitudinally, and including a left wing part and a right wing part, which are oppositely disposed around the passenger's head, an upper cushion part connecting the left and right wing parts, and an outlet hole through which an inflation gas from an inflator is transferred; and, an inner cushion disposed between the left and right wing parts, which has an inlet hole through which the inflation gas is supplied from the outer cushion via the outlet hole of the outer cushion, and a discharge hole through which the inflation gas is discharged to the outside.

The outer cushion may serve to restrain the passenger's shoulders from moving forwards with the left and right wing parts, and the inner cushion may be formed as a single unit that protrudes from a lower side toward an upper side thereof to fill a space between the left and right wing parts.

The upper cushion part of the outer cushion may connect upper portions of the left and right wing parts, and may be equipped therein with the inflator.

The outlet hole may be provided on either of inner surfaces at lower sides of the left and right wing parts of the outer cushion, the inlet hole may be provided on either of opposite surfaces at a lower side of the inner cushion that correspond to the position of the outlet hole, and the discharge hole may be provided at a front side of the inner cushion.

A lower portion of the inner cushion may be fixed to the left and right wing parts, and an upper portion of the inner cushion may be separated from the left and right wing parts.

According to the configuration of the present invention, the roof airbag device for a vehicle can shorten a distance between the device and a passenger to ensure quick restraint of the passenger, even with low capacity equipment, thereby reducing the weight and cost, can provide a differentiated support to support the passenger's head and upper body to thereby effectively prevent an injury to the passenger's head and upper body, and can be deployed irrespective of the designs of a dash board and a windshield to thereby facilitate its standardization.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
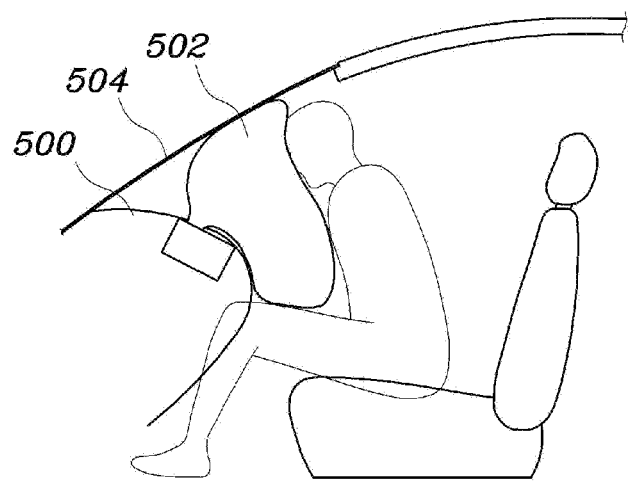
FIG. 1 is a view of a passenger-side roof airbag device for a vehicle according to the related art.
Figure 2:
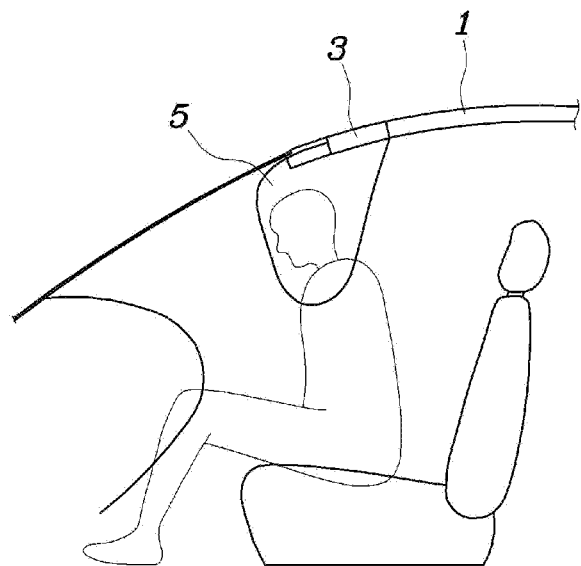
FIG. 2 is a conceptual view showing an exemplary concept of a roof airbag device for a vehicle according to the present invention.

Reference will now be made in detail to various embodiments of the present invention(s), examples of which are illustrated in the accompanying drawings and described below. Wherever possible, the same reference numerals will be used throughout the drawings and the description to refer to the same or like parts. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
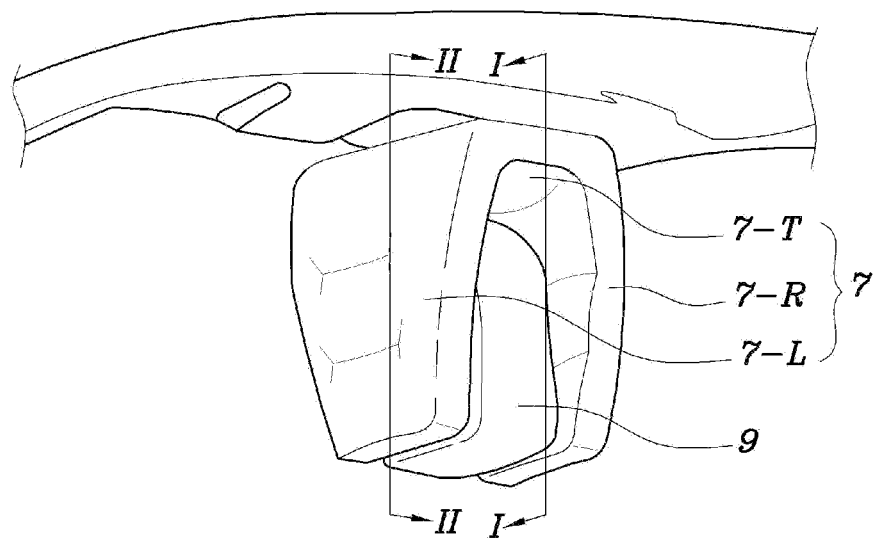
FIG. 3 is a view of an exemplary roof airbag device mounted in a vehicle.

Referring to FIG. 3, a roof airbag device for a vehicle according to the present invention includes a housing 3 which is mounted on an inner surface of the roof 1 of a vehicle, and an airbag cushion 5 which, when inflated, is deployed downwards from the housing 3 to moderately restrain and cushion the passenger's head and upper body.

As shown in FIGS. 3 to 7, the roof airbag device includes the housing 3 which is mounted on the inner surface of the roof of a vehicle, an outer cushion 7 which is built in to the housing and is designed to inflate and deploy downwards from the housing towards the front of the passenger's shoulders, an inner cushion 9 which is built in to the housing 3, and is designed to inflate and deploy downwards from the housing towards the front of the passenger's head, so that the inner cushion is placed in the outer cushion 7, and an inflator 11 which provides an inflation gas which is supplied to both the outer cushion 7 and the inner cushion 9.

Specifically, the outer cushion 7 has a shape of an inverted-U type, a circumferential wall of which extends longitudinally. The outer cushion has a left wing part 7-L and a right wing part 7-R, which are oppositely disposed around the passenger's head, and an upper cushion part 7-T connecting the left and right wing parts 7-L and 7-R. The outer cushion also has outlet holes 13 through which the inflation gas from the inflator 11 is transferred to the inner cushion 9.

The inner cushion 9 is disposed between the left and right wing parts 7-L and 7-R, and has inlet holes 15 through which the inflation gas is supplied from the outer cushion 7, and a discharge hole 17 through which the inflation gas is discharged to the outside.

The outer cushion 7 serves to restrain the passenger's shoulders from moving forwards with its left and right wing parts 7-L and 7-R, and the inner cushion 9 is formed as a single unit that protrudes from the lower side toward the upper side to fill the space between the left and right wing parts 7-L and 7-R.

The upper cushion part 7-T of the outer cushion 7 connects the upper portions of the left and right wing parts 7-L and 7-R, and is equipped therein with the inflator 11.

That is, with the arrangement of the inflator provided in the upper cushion part 7-T, the inflation gas supplied from the inflator 11 directly fills the inside of the outer cushion 7, and subsequently fills the inner cushion 9 via the outlet holes 13 and the inlet holes 15.

The outlet holes 13 are provided on inner surfaces at lower sides of the left and right wing parts 7-L and 7-R of the outer cushion 7, the inlet holes 15 are provided on opposite surfaces at a lower side of the inner cushion 9 that correspond to the positions of the outlet holes 13, and the discharge hole 17 is provided at the front side of the inner cushion 9.

Figure 4:
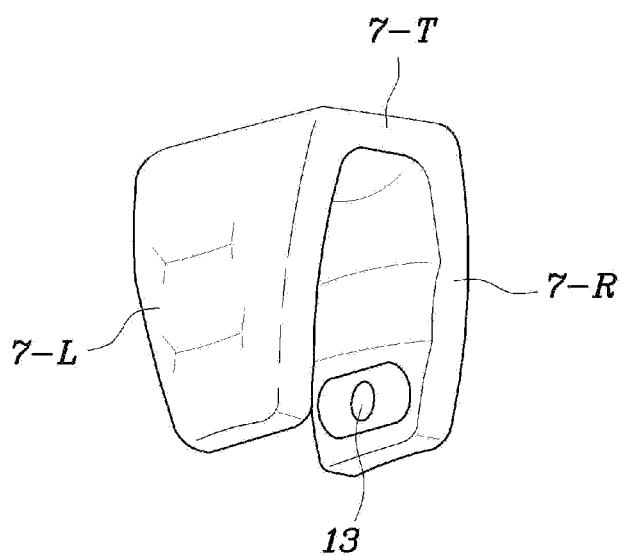
FIG. 4 is a view of an outer cushion shown in FIG. 3.
Figure 5:
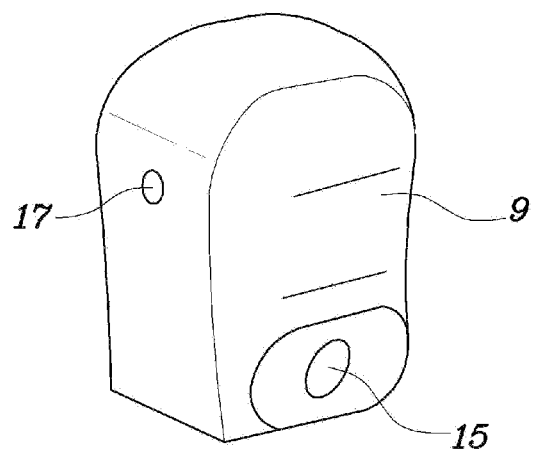
FIG. 5 is a view of an inner cushion shown in FIG. 3.
Figure 6:
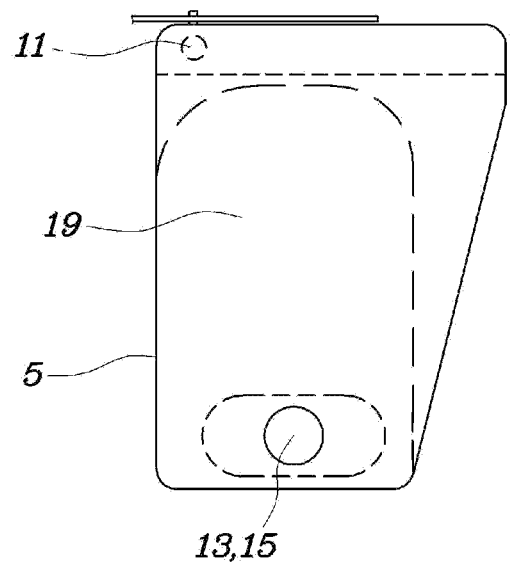
FIG. 6 is a sectional view taken along line I-I of FIG. 3.
Figure 7:
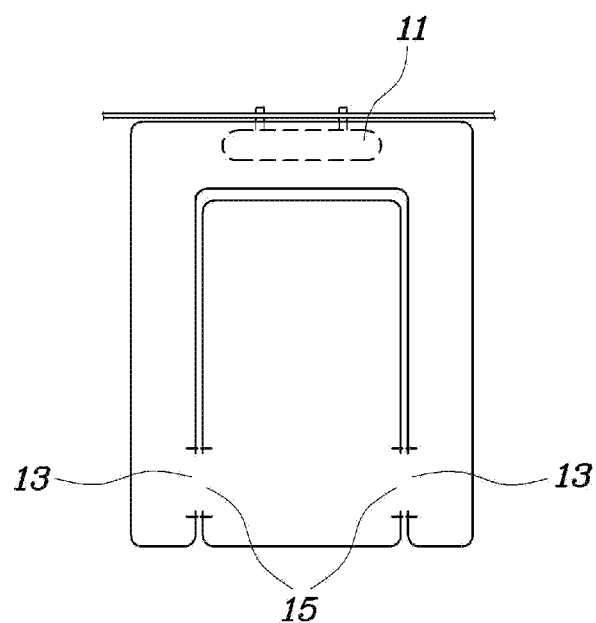
FIG. 7 is a sectional view taken along line II-II of FIG. 3.

For reference, a dotted line shown in FIGS. 4 to 6 indicates an engaged portion at which the outer cushion 7 and the inner cushion 9 are sewn together.

The lower portion of the inner cushion 9 is fixed to the left and right wing parts 7-L and 7-R, and the upper portion of the inner cushion is separated from the left and right wing parts 7-L and 7-R.

Thus, when the passenger's head collides with the inner cushion 9, the upper portion of the inner cushion 9 is slightly bent forwards separately from the outer cushion 7 to thereby cushion the passenger's head and to allow for natural movements of the passenger's head and neck.

Figure 8:
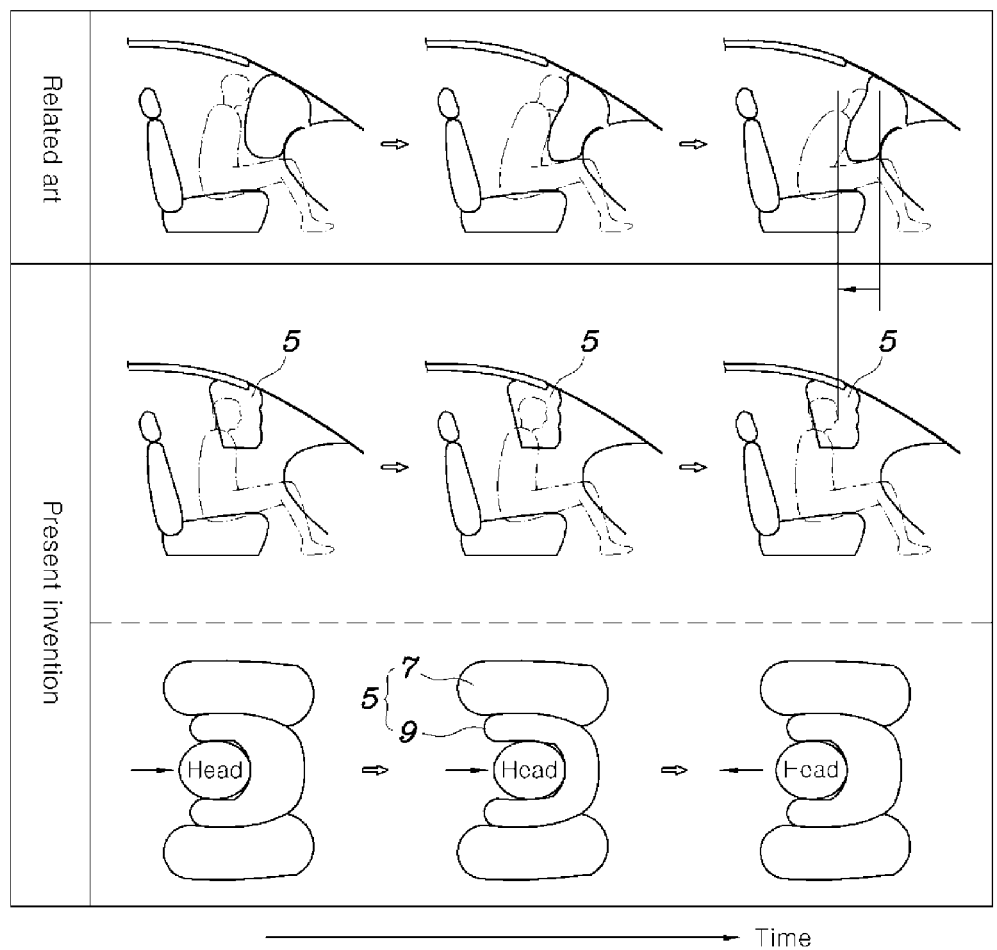
FIG. 8 is a view showing the comparison of an operation between the present invention and the related art.

FIG. 8 is a view showing an operation of the roof airbag device of the invention compared to the related art, wherein changes in operation are shown in a side view from left to right according to the progress of time, together with a plan view in which the behavior of the passenger's head with respect to the outer cushion 7 and the inner cushion 9 is shown.

In FIG. 8, in the case of the related art technology, the forward displacement of a passenger is relatively large, and the passenger's head or neck and upper body are supported en bloc so that they cannot be independently supported. On the contrary, in the case of the present invention, the outer cushion 7 rapidly and firmly supports the passenger's shoulders to lessen the forward displacement of the passenger, and the inner cushion 9 relatively smoothly and softly cushions the passenger's head while allowing the head to slightly move forwards so that the passenger's head and neck can move naturally and stably, thereby preventing them from being bent and damaged.

For convenience in explanation and accurate definition in the appended claims, the terms upper or lower, front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roof airbag device for a vehicle, comprising:
   an outer cushion having, when inflated, a inverted-U shape, a circumferential wall of which extends longitudinally, and including a left wing part and a right wing part, which are oppositely disposed to define a head-receiving region, an upper cushion part connecting the left and right wing parts, and an outlet hole through which an inflation gas from an inflator is flows; and
   an inner cushion disposed between the left and right wing parts, and having an inlet hole through which the inflation gas is supplied from the outer cushion via the outlet hole of the outer cushion, and a discharge hole through which the inflation gas is discharged to the outside.

2. The roof airbag device for a vehicle according to claim 1, wherein the left and right wing parts of the outer cushion is configured to restrain a passenger's shoulders from moving forwards when the outer cushion is inflated, and the inner cushion is formed as a single unit that protrudes from a lower side toward an upper side thereof to fill the head-receiving region between the left and right wing parts.

3. The roof airbag device for a vehicle according to claim 1, wherein the upper cushion part of the outer cushion connects upper portions of the left and right wing parts, and is equipped therein with the inflator.

4. The roof airbag device for a vehicle according to claim 1, wherein the outlet hole is provided on either one or more of inner surfaces at lower sides of the left and right wing parts of the outer cushion, the inlet hole is provided on either one or more of opposite surfaces at a lower side of the inner cushion that correspond to the position of the outlet hole, and the discharge hole is provided at a front side of the inner cushion.

5. The roof airbag device for a vehicle according to claim 1, wherein a lower portion of the inner cushion is fixed to the left and right wing parts, and an upper portion of the inner cushion is separated from the left and right wing parts.

* * * * *